United States Patent [19]

Sumal

[11] Patent Number: 4,587,844
[45] Date of Patent: May 13, 1986

[54] FLOW RATE METER

[75] Inventor: Jaihind S. Sumal, Vaihingen-Ensingen, Fed. Rep. of Germany

[73] Assignee: Robert Bosch GmbH, Stuttgart, Fed. Rep. of Germany

[21] Appl. No.: 713,718

[22] Filed: Mar. 19, 1985

[30] Foreign Application Priority Data

May 10, 1984 [DE] Fed. Rep. of Germany ....... 3417305

[51] Int. Cl.$^4$ .............................................. G01F 1/68
[52] U.S. Cl. ..................................................... 73/204
[58] Field of Search ......................................... 73/204

[56] References Cited

U.S. PATENT DOCUMENTS 4,024,761  5/1977  Djorup ................................. 73/204
4,264,961  4/1981  Nishimura et al. ................. 73/204
4,294,114  10/1981  Lauterbach .......................... 73/204

Primary Examiner—Herbert Goldstein
Attorney, Agent, or Firm—Edwin E. Greigg

[57] ABSTRACT

A temperature-dependent measuring resistor layer is applied to a first carrier, the temperature and/or resistance of which layer is regulated in accordance with the mass of the medium. The first carrier is approximately rectangular and in particular is disposed parallel to the flow direction in a convergent section of the flow cross section. In a parallel section of the flow cross section, a second carrier having a compensating resistor is disposed, which likewise has a rectangular cross section and in particular extends parallel to the flow direction. An arrangement of this kind not only avoids deposits on the end face of the first carrier pointing into the flow but also prevents the result of measurement at the measuring resistor layer from being affected by the position of the second carrier in the flow cross section.

4 Claims, 1 Drawing Figure

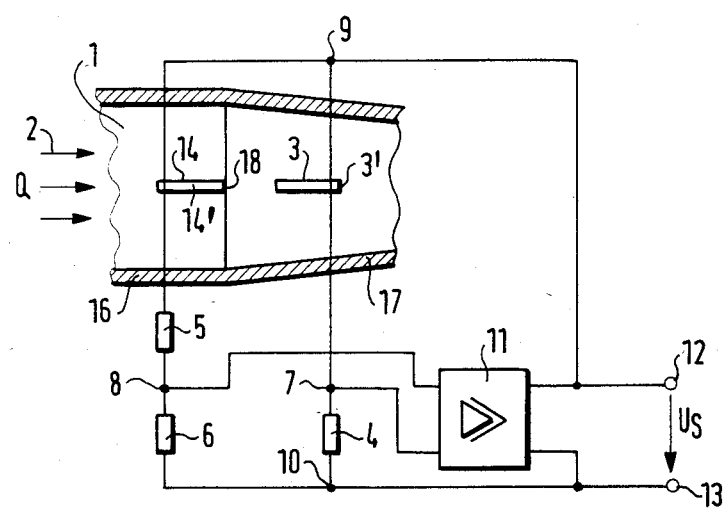

FLOW RATE METER

BACKGROUND OF THE INVENTION

The invention is based on an apparatus as defined hereinafter. An apparatus is already known in which a second carrier, having a second resistor layer, is disposed downstream of a first carrier having a measuring resistor layer in a parallel section of a flow cross section. As a result, although deposits of dirt which cause a change in the characteristic curve of the measuring resistor layer are prevented from forming on the face of the first carrier, which points upstream and has the measuring resistor layer, nevertheless such an arrangement has the disadvantage that upon slight changes in the position of the second carrier, the flow around the first carrier is changed quite severely, and so the measurement signal of the measuring resistor layer is undesirably changed severely as well.

OBJECT AND SUMMARY OF THE INVENTION

The apparatus according to the invention has the advantage over the prior art that positional changes of the second carrier in the flow cross section cause, at most, a negligibly slight change in the measurement signal furnished by the measuring resistor layer.

The invention will be better understood and further objects and advantages thereof will become more apparent from the ensuing detailed description of a preferred embodiment taken in conjunction with the drawing.

BRIEF DESCRIPTION OF THE DRAWING

The single FIGURE of the drawing shows a preferred embodiment of the invention in simplified schematic form.

DESCRIPTION OF THE PREFERRED EMBODIMENT

The drawing shows a flow cross section 1, for instance an air intake tube of an internal combustion engine, not shown, through which a medium, for instance the air aspirated by the engine, flows in the direction of the arrows 2. Located in the flow cross section 1, for instance as part of a flow rate meter, is a temperature-dependent measuring resistor layer 3, for instance a hot film resistor, which is applied to a first carrier 3' and through which the output variable of a regulator flows and which simultaneously furnishes the input variable for the regulator. The temperature of the temperature-dependent measuring resistor layer 3 is regulated by the regulator to a fixed value, which is above the average temperature of the medium. If the flow rate, that is, the mass of the medium flowing per unit of time and having a flow value of Q, increases, then the temperature-dependent measuring resistor layer 3 cools down to an increased extent. This cooling is fed back to the input of the regulator, causing the latter to increase its output variable such that the fixed temperature value is reestablished at the temperature-dependent measuring resistor layer. The output variable of the regulator regulates the temperature of the temperature-dependent measuring resistor layer 3 to the predetermined value whenever there are changes in the flow value Q and simultaneously represents a standard for the mass of the flowing medium, which can be delivered in the form of a measured flow value $U_S$ to a metering circuit of an internal combustion engine, for instance, for adapting the required fuel quantity to the quantity of air aspirated per unit of time. The first carrier 3' has an approximately rectangular cross section in the flow direction and in particular has a longitudinal extent which extends parallel to the flow direction.

The temperature-dependent measuring resistor layer 3 is disposed in a resistor measuring circuit, for instance a bridge circuit, and together with a resistor 4 forms a first bridge branch, to which a second bridge branch comprising the two fixed resistors 5 and 6 is connected in parallel. The pickup point 7 is located between the resistors 3 and 4, and the pickup point 8 is located between the resistors 5 and 6. The two bridge branches are connected in parallel at points 9 and 10. The diagonal voltage of the bridge that occurs between points 7 and 8 is delivered to the input of an amplifier 11, to the output terminals of which the points 9 and 10 are connected, so that its output variable supplied the bridge with operating voltage, or operating current. The flow value $U_S$ simultaneously serving as a regulator output can be picked up between the terminals 12 and 13, as shown.

The temperature-dependent measuring resistor layer 3 is heated up by the current flowing through it up to a value at which the input voltage of the amplifier 11, that is, the bridge diagonal voltage, becomes zero or assumes a predetermined value. From the output of the amplifier, a specific current flows into the bridge circuit. If the temperature of the temperature-dependent measuring resistor layer 3 varies as a result of changes in the mass Q of the flowing medium, then the voltage at the bridge diagonal varies as well, and the amplifier 11 regulates the bridge supply voltage or current to a value for which the bridge is once again balanced, or is imbalanced in a predetermined manner. The output variable of the amplifier 11, that is, the regulator output $U_S$, like the current in the temperature-dependent measuring resistor layer 3, represents a measured flow value for the mass of the flowing medium, for instance the mass of air aspirated by an internal combustion engine.

To compensate for the effect of the temperature of the medium on the result of measurement, it is suitable for a second temperature-dependent resistor, the compensating resistor layer 14, which experiences the flow around it of the medium, to be incorporated into the second bridge branch. The size of the resistors 5, 6 and 14 should be selected such that the power loss through the compensating resistor layer 14, which is generated by the branch current flowing through it, is so slight that the temperature of this resistor 14 varies practically not at all with changes in the bridge voltage and instead always corresponds to the temperature of the medium flowing past it.

The compensating resistor layer 14 is applied to a second carrier 14', which has an approximately rectangular cross section in the flow direction and in particular has a longitudinal extent which extends parallel to the flow direction. To prevent deposits from forming on the end face of the first carrier 3', which has the measuring resistor layer 3 and faces into the flow, and thus resulting in an inaccurate measured flow value $U_S$, the second carrier 14' is disposed in the flow cross section 1 upstream of and in alignment with the first carrier 3'. The first carrier 3' and the second carrier 14' are in particular fabricated from electrically nonconductive material, such as ceramic. The cross section of the second carrier 14' having the compensating resistor layer 14 transverse to the flow direction 2 should be at least equal in size to the cross section of the first carrier 3' having the measuring resistor layer 3 transverse to the flow direction 2. To prevent the measured flow value $U_S$, determined by the measuring resistor layer 3, from being sensitive to the position of the second carrier 14' in the flow cross section, the invention provides that the flow cross section 1 has a parallel section 16 and downstream thereof and continuous therewith a convergent section 17, and the second carrier 14' having the compensating resistor layer 14 is disposed in the parallel section 16 and the first carrier 3' having the measuring resistor layer 3 is disposed in the convergent section 17. Advantageously, the second carrier 14' is disposed in the parallel section 16 such that the parallel section 16 ends, and the convergent section 17 begins, approximately where the end 18 of the second carrier 14' facing away from the flow is located.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. An apparatus for measuring the aspirated air mass of internal combustion engines, comprising a measuring resistor layer disposed in a flow cross section on a first carrier of approximately rectangular cross section having a longitudinal extent arranged parallel to the flow direction, a second resistor layer disposed in said flow cross section on a second carrier of approximately rectangular cross section having a longitudinal extent parallel to said flow direction, said flow cross section further having one parallel section and a continuous convergent section, said second carrier having said resistor layer arranged to serve as a compensating resistor disposed in alignment with and upstream from said first carrier wherein said second carrier is located in the parallel section of the flow cross section and said first carrier having said measuring resistor layer is located in the convergent section of said flow cross section.

2. An apparatus as defined by claim 1, further wherein said cross section of said second carrier having the compensating resistor layer arranged transverse to the flow direction is at least equal to said cross section of said first carrier having said measuring resistor arranged transverse to said flow direction.

3. An apparatus as defined by claim 1, further wherein said second carrier is disposed in said parallel section of said flow cross section whereby said parallel section terminates approximately with the downstream end of said second carrier arranged to be remote from the flow.

4. An apparatus as defined by claim 2, further wherein said second carrier is disposed in said parallel section of said flow cross section whereby said parallel section terminates approximately with the downstream end of said second carrier arranged to be remote from the flow.

* * * * *